B. O. CUDDIGAN.
POTATO CUTTING MACHINE.
APPLICATION FILED FEB. 23, 1918.
1,273,039.
Patented July 16, 1918.
2 SHEETS—SHEET 1.
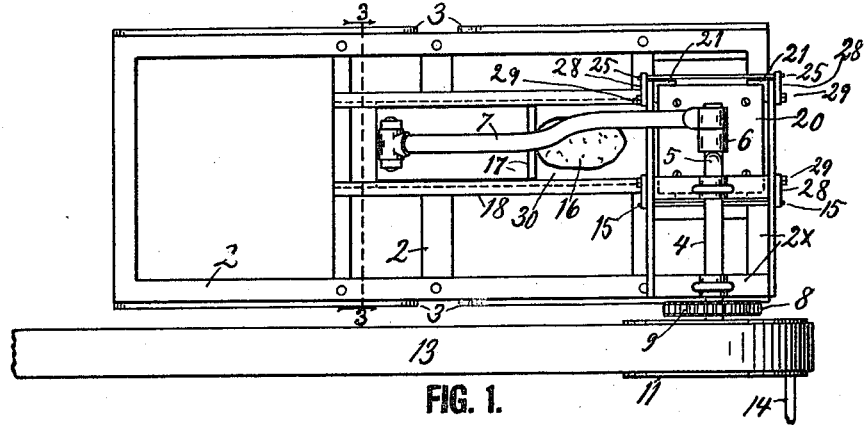
FIG. 1.
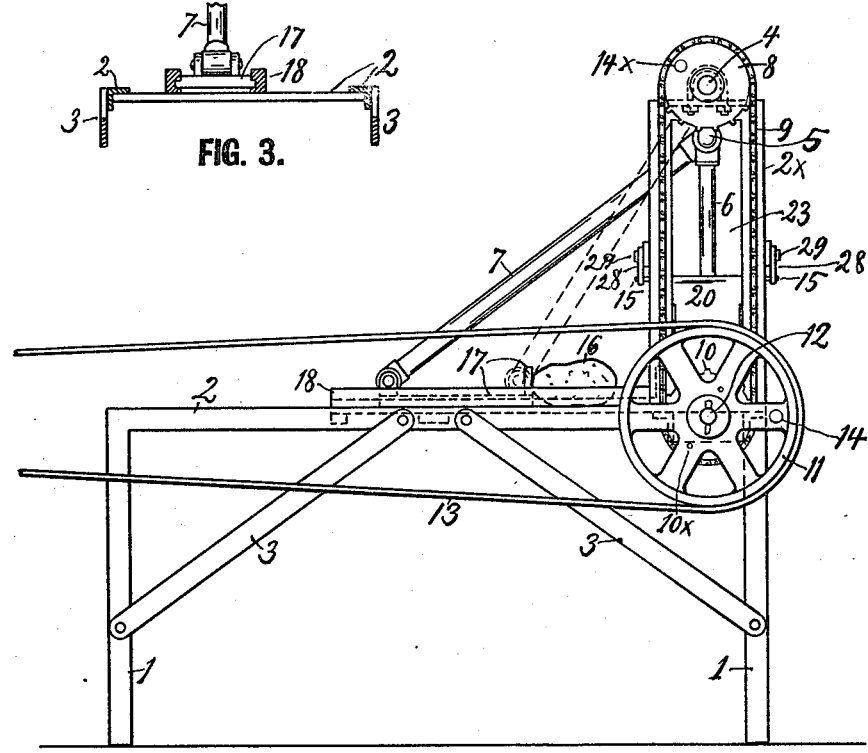
FIG. 3.
FIG. 2.
INVENTOR.
B. O. Cuddigan.
BY HIS ATTORNEY
A. M. Carlsen.

B. O. CUDDIGAN.
POTATO CUTTING MACHINE.
APPLICATION FILED FEB. 23, 1918.

1,273,039.

Patented July 16, 1918.
2 SHEETS—SHEET 2.

INVENTOR:
B. O. Cuddigan
BY his ATTORNEY:
A. M. Carlsen

UNITED STATES PATENT OFFICE.

BARTHOLOMEW O. CUDDIGAN, OF WADENA, MINNESOTA.

POTATO-CUTTING MACHINE.

1,273,039.   Specification of Letters Patent.   Patented July 16, 1918.

Application filed February 23, 1918. Serial No. 218,855.

*To all whom it may concern:*

Be it known that I, BARTHOLOMEW O. CUDDIGAN, a citizen of the United States, residing at Wadena, in the county of Wadena and State of Minnesota, have invented a new and useful Potato-Cutting Machine, of which the following is a specification.

This invention relates to machines for cutting seed potatoes into several parts or pieces preparatory to the planting and the object is to provide a cheap, simple and practical potato cutting machine which may be operated partly or entirely by hand power.

Figures 4, 5:
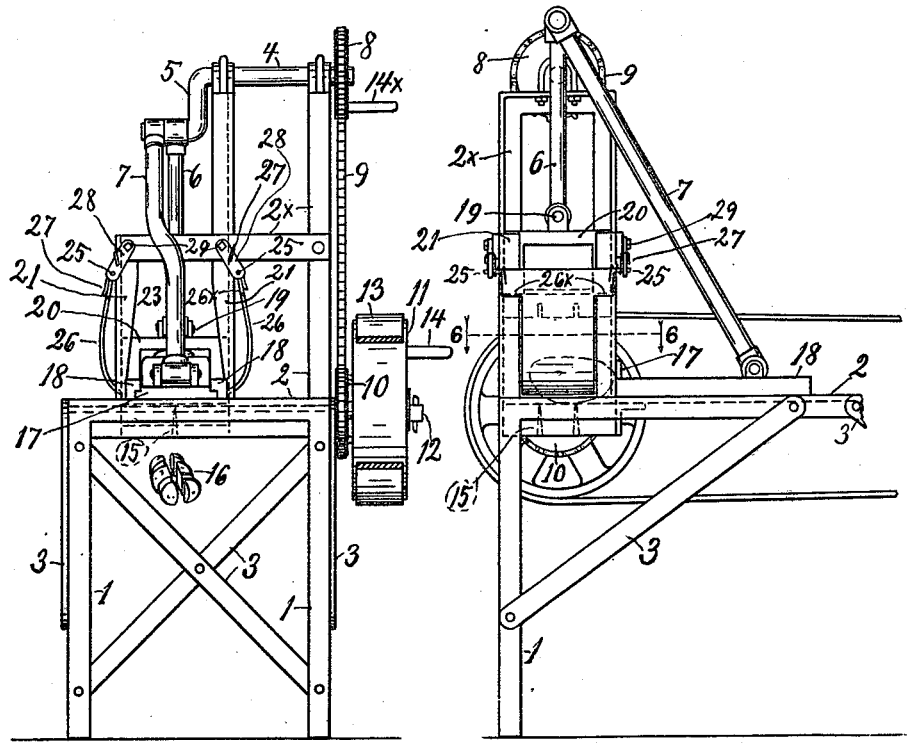
Figure 6:
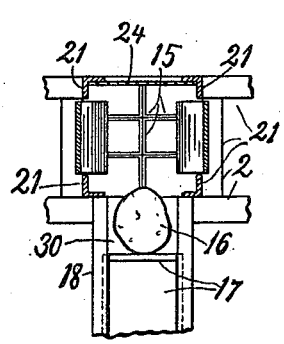
Figure 7:
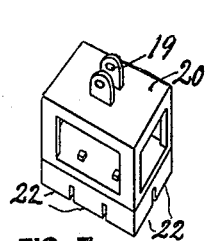
Figure 8:
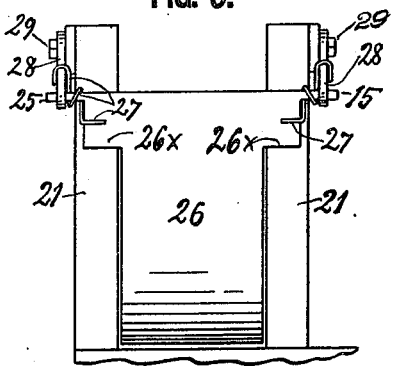

In the accompanying drawings, Figure 1 is a top view of my improved potato cutter. Fig. 2 is a side elevation of the same, and Fig. 3 is a cross section on the line 3—3 in Fig. 1. Fig. 4 is Fig. 2 seen from left to right. Fig. 5 is a portion of Fig. 4 viewed from left to right. Fig. 6 is a detail section on the line 6—6 in Fig. 5. Fig. 7 is a perspective view of the plunger or head that presses the potatoes against the cutter blades. Fig. 8 is a portion of Fig. 5 enlarged.

Referring to the drawings by reference numerals, 1 designates legs upon which a main frame 2 is mounted and made firm by braces 3. In an upward extension $2^\times$ of the frame is journaled a shaft 4 having a crank 5, which operates two rods 6 and 7. Said shaft is provided with a sprocket 8, which is driven by a link-belt 9 from a sprocket 10. The latter is secured at $10^\times$ to a pulley 11 and with the pulley rotatably mounted on a stud 12. Said pulley may be driven by a belt 13 or a handle 14 where belt power may not be available.

Near what may be termed the rear end of the main frame is fixed a cutting device composed of crossing cutter blades 15, (see Fig. 6) arranged with their edges upward. In upon said cutting device the potatoes are moved one by one, in the position indicated by a potato 16, by a horizontal slide 17, which is mounted in guides 18 forming a channel 30 and operated by the rod 7.

The other rod, 6, is pivoted at 19 to a skeletoned plunger 20, which has its corners guided in upright angle iron bars 21 of the frame and has its bottom end or face formed with projections 22, (see Fig. 7) adapted to push the potato through the set of knives or blades until it drops as indicated at 16 in Fig. 4.

The chamber 23 in which the plunger 20 moves may have its front side open and its rear side closed by a wall 24 (see Figs. 4 and 6); and in each of the other sides is pivoted at 25 a plate 26. The lower ends of said plates converge together and serve to hold each potato, whether small or large, at the middle of the cutting device 15. Each plate is at all times impelled inward by springs 27 (best shown in Fig. 8), and is pivoted in a pair of arms 28 which are secured on the frame work each one by a single bolt or screw 29.

In the operation of the machine, if power is available the belt 13 is driven and while the machine is thus run, the operator drops the potatoes one by one into the channel 30 (see Fig 6) as fast as the slide 17 gets into position to permit it, and as the plunger 20 descends upon each potato and acts upon the inner sides of the plates 26 to spread them and leave the potato resting upon the cutters in position to be cut, and is cut by being pushed through the cutters.

As the plunger ascends again the springs 27 close in the plates 26 until their shoulders $26^\times$ (see Fig. 8) stop against the posts 21 and leave the lower edges of the plates so close together as to guide even the smallest seed potato to the center of the cutting device 15. If the potatoes operated on are extra small or extra large the space between the lower ends of the plates may be varied by loosening the screws 29 and changing the arms 28 to a more or less inclined position. For it is obvious that the more horizontal those arms stand the farther the plates will close against the posts 21, and the more the arms are lowered the earlier said shoulders $26^\times$ will touch the posts and limit the closing of the plates.

If no power is available the machine may be operated by a handle placed either in the pulley 11 as 14, or in the sprocket 8, as $14^\times$. When operated by hand one person may turn the crank shaft 4, and another person feed in the potatoes, or for light potato farming the same person may turn the machine with one hand and feed it with the other hand. In any case a receptacle (not shown) is placed underneath the frame to receive the cut potatoes.

What I claim is:

1. In a potato cutting machine, and mounted in a suitable frame, a cutting device composed of fixed crossed blades with their edges upward, a vertically reciprocated plunger having projections by which to push each potato through said cutting device, a horizontal feed channel into which the potato is placed, a feeding slide in said channel, a crank shaft mounted in the frame, and two connecting rods extending from the crank and having their other ends connected one to the plunger and the other to the feeding slide, and means for rotating the crank shaft.

2. In a potato cutting machine and mounted in a suitable frame, a cutting device, a vertically reciprocated plunger arranged to push each potato through the cutting device, a horizontal feed channel into which the potato is placed, a feeding slide in the channel, a crank shaft operatively connected with said plunger and slide to operate them in successive alternate order, and means for rotating the crank shaft by hand or by other power, as may be desired.

3. In a seed potato cutting machine, a frame, a cutting device, a pair of hinged spring-closed plates arranged to guide each potato to the middle of the cutting device, a reciprocated plunger arranged to spread the plates and press the potato against the cutting device; said plates arranged to have their closing movement stopped by their contact with the frame, the plates being each pivoted in a pair of inclined arms, means for securing each of said arms to the frame in such a manner that the incline of the arm may be varied and the plates thereby allowed to close more or less before stopping against the frame.

In testimony whereof I affix my signature.

BARTHOLOMEW O. CUDDIGAN.

Copies of this patent may be obtained for five cents each, by addressing the "Commissioner of Patents, Washington, D. C."